(12) United States Patent
Eathakota

(10) Patent No.: US 11,312,331 B2
(45) Date of Patent: Apr. 26, 2022

(54) SYSTEM AND METHOD FOR PROVIDING TEMPORARY ACCESS TO A VEHICLE

(71) Applicant: Carrier Corporation, Palm Beach Gardens, FL (US)

(72) Inventor: Hrishi Eathakota, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/251,252

(22) PCT Filed: Nov. 11, 2019

(86) PCT No.: PCT/US2019/060690
§ 371 (c)(1),
(2) Date: Dec. 11, 2020

(87) PCT Pub. No.: WO2020/102059
PCT Pub. Date: May 22, 2020

(65) Prior Publication Data
US 2021/0245708 A1  Aug. 12, 2021

(30) Foreign Application Priority Data
Nov. 13, 2018  (IN) .............................. 201811042571

(51) Int. Cl.
*B60R 25/24* (2013.01)
*H04W 4/80* (2018.01)
(Continued)

(52) U.S. Cl.
CPC ............ *B60R 25/241* (2013.01); *B60R 25/01* (2013.01); *B60W 60/00253* (2020.02);
(Continued)

(58) Field of Classification Search
None
See application file for complete search history.

(56) References Cited

U.S. PATENT DOCUMENTS 9,189,900 B1   11/2015 Penilla et al.
9,194,168 B1   11/2015 Lu et al.
(Continued)

FOREIGN PATENT DOCUMENTS

CN   105654184   6/2016
KR   101294088   8/2013
(Continued)

OTHER PUBLICATIONS

General Motors, 2018, Self-Driving Safety Report.
(Continued)

*Primary Examiner* — Carlos Garcia
(74) *Attorney, Agent, or Firm* — Carlson, Gaskey & Olds, P.C.

(57) ABSTRACT

A method for providing temporary access to a vehicle includes receiving a vehicle access request at a vehicle, transporting the vehicle from a storage space to a user originating the vehicle access request using the at least one of the semi-autonomous mode and the fully autonomous mode, providing the user access to the vehicle via a smart-lock system, and transporting the vehicle from the user to the storage space subsequent to the user's access. The vehicle includes a controller configured to operate the vehicle in at least one of a semi-autonomous mode and a fully autonomous mode.

19 Claims, 3 Drawing Sheets

(51) Int. Cl.
*G07C 9/23* (2020.01)
*B60W 60/00* (2020.01)
*B60R 25/01* (2013.01)
*G06Q 10/02* (2012.01)
*G06Q 50/30* (2012.01)
*G07C 9/00* (2020.01)
*H04W 4/021* (2018.01)

(52) U.S. Cl.
CPC .............. *G06Q 10/02* (2013.01); *G06Q 50/30* (2013.01); *G07C 9/00309* (2013.01); *G07C 9/00896* (2013.01); *G07C 9/23* (2020.01); *H04W 4/021* (2013.01); *H04W 4/80* (2018.02); *B60R 2325/101* (2013.01); *G07C 2009/00769* (2013.01); *G07C 2009/00936* (2013.01)

(56) References Cited

U.S. PATENT DOCUMENTS

| | | | |
|---|---|---|---|
| 9,256,852 | B1 | 2/2016 | Myllymaki |
| 9,915,949 | B2 | 3/2018 | Schwie et al. |
| 10,074,223 | B2 | 9/2018 | Newman |
| 10,233,021 | B1* | 3/2019 | Brady .................. G05D 1/0282 |
| 10,331,124 | B2* | 6/2019 | Ferguson ........... G06K 9/00825 |
| 2013/0082820 | A1 | 4/2013 | Tieman |
| 2014/0278608 | A1* | 9/2014 | Johnson ................ G01S 19/51 |
| | | | 705/5 |
| 2015/0203125 | A1 | 7/2015 | Penilla et al. |
| 2015/0343993 | A1* | 12/2015 | Ferrieres ................ B60R 25/04 |
| | | | 701/2 |
| 2017/0083862 | A1* | 3/2017 | Loubriel ............ G06Q 10/0835 |
| 2017/0123423 | A1* | 5/2017 | Sako .................... G05D 1/0088 |
| 2017/0132118 | A1 | 5/2017 | Stefan et al. |
| 2017/0329346 | A1* | 11/2017 | Latotzki ............... G05D 1/0088 |
| 2017/0349146 | A1 | 12/2017 | Krishnan |
| 2018/0025392 | A1* | 1/2018 | Helstab ................ G06Q 10/06 |
| | | | 705/306 |
| 2018/0053276 | A1 | 2/2018 | Iagnemma et al. |
| 2019/0005445 | A1* | 1/2019 | Bahrainwala .... G06Q 10/08355 |
| 2019/0035282 | A1* | 1/2019 | Ferguson ............... B65G 67/24 |

FOREIGN PATENT DOCUMENTS

| | | |
|---|---|---|
| WO | 2016201355 | 12/2016 |
| WO | 2018111674 | 6/2018 |

OTHER PUBLICATIONS

International Search Report and Written Opinion for International Patent Application No. PCT/US2019/060690 dated Apr. 20, 2020.
Waymo Safety Report, On the Road to Fully Self-Driving.
International Preliminary Report on Patentability for International Patent Application No. PCT/US2019/060690 dated May 27, 2021.

* cited by examiner

SYSTEM AND METHOD FOR PROVIDING TEMPORARY ACCESS TO A VEHICLE

CROSS-REFERENCE TO RELATED APPLICATIONS

This application claims priority to Indian Provisional Application No. 201811042571, which was filed on Nov. 13, 2018 and is incorporated herein by reference.

TECHNICAL FIELD

The present disclosure relates generally to providing temporary access to an autonomous or semi-autonomous vehicle.

BACKGROUND

Automobile dealerships and rental businesses frequently provide temporary access to a vehicle for the purposes of a test drive, or a rental period. A limiting factor on the customer's access to the vehicle for either purpose in conventional systems is the requirement that the customer physically travel to the location of the vehicle before they can gain access to the vehicle for the duration of their temporary access.

Current autonomous vehicle technology is increasing to a state where cars, trucks, and other automobiles are able to be driven along pre-determined routes without requiring an operator either via remote control, or via a fully automated vehicle control system. Providing the vehicles to customers at the customer's location is possible, however a method is needed to ensure that only the customer who ordered the vehicle, or someone authorized by the customer, is able to access and operate the vehicle.

SUMMARY OF THE INVENTION

An exemplary method for providing temporary access to a vehicle includes receiving a vehicle access request at a vehicle, wherein the vehicle includes a controller configured to operate the vehicle in at least one of a semi-autonomous mode and a fully autonomous mode, transporting the vehicle from a storage space to a user originating the vehicle access request using the at least one of the semi-autonomous mode and the fully autonomous mode, providing the user access to the vehicle via a smartlock system, and transporting the vehicle from the user to the storage space subsequent to the user's access.

In another example of the above described exemplary method for providing access to a vehicle the smartlock system includes a keybox containing a keyfob, and wherein providing the user access to the vehicle includes providing the user with access to the keybox.

In another example of any of the above described exemplary methods for providing access to a vehicle providing the user access to the keybox is performed subsequent to a multi-factor user authentication.

In another example of any of the above described exemplary methods for providing access to a vehicle the multi-factor authentication includes digitally providing the user with an access code via a user application and an entry of the access code into the keybox via the user.

In another example of any of the above described exemplary methods for providing access to a vehicle providing the user access to the vehicle includes providing a limited geographic driving zone to the controller through the smartlock system.

In another example of any of the above described exemplary methods for providing access to a vehicle the limited geographic driving zone is a predefined driving route.

In another example of any of the above described exemplary methods for providing access to a vehicle the limited geographic zone is a geofence.

In another example of any of the above described exemplary methods for providing access to a vehicle the limited geographic zone is stored in a local memory of the smartlock system.

In another example of any of the above described exemplary methods for providing access to a vehicle the limited geographic zone is stored remote from the smartlock system and accessed via the data network.

In another example of any of the above described exemplary methods for providing access to a vehicle receiving the vehicle access request includes receiving a geographic location of the user and a desired arrival time of the vehicle.

In another example of any of the above described exemplary methods for providing access to a vehicle transporting the vehicle from the user to the storage space subsequent to the user's access comprises providing the user with a confirmation that the user is ending the temporary access.

In another example of any of the above described exemplary methods for providing access to a vehicle transporting the vehicle from the storage space to the user originating the temporary access request comprises one of autonomously and semi autonomously transporting the vehicle to a receiving area of a lot.

In another example of any of the above described exemplary methods for providing access to a vehicle transporting the vehicle from the storage space to the user originating the temporary access request comprises one of autonomously and semi autonomously transporting the vehicle from a lot to a geographic location provided by the user.

In one exemplary embodiment an automated vehicle delivery system includes a vehicle, wherein the vehicle is at least semi-automated and includes a vehicle controller configured to at least semi-autonomously control the vehicle, a smartlock system connected to the vehicle, wherein the smartlock system includes a memory, a processor, and an input/output (i/o) system configured to connect to a data network, wherein the smartlock system is interfaced with the vehicle controller, and wherein the smartlock system includes a restricted access compartment configured to be accessed from an exterior of the vehicle and configured to contain an access component for the vehicle.

In another example of the above described automated vehicle delivery system the restricted access compartment is secured via a multi-factor authentication.

In another example of any of the above described automated vehicle delivery systems the multi-factor authentication includes a plurality of button inputs and a personal identification number (PIN).

In another example of any of the above described automated vehicle delivery systems the multi-factor authentication includes a short range communication system.

In another example of any of the above described automated vehicle delivery systems the short range communication system is configured to interface with a computerized device configured to run a specialized software application.

In another example of any of the above described automated vehicle delivery systems the vehicle further includes a memory storing instructions configured to cause the automated vehicle delivery system to perform the steps of receiving a vehicle access request at the vehicle, transporting the vehicle from a storage space to a user originating the vehicle access request using at least one of a semi-autonomous mode and a fully autonomous mode, providing the user access to the vehicle via the smartlock system, and transporting the vehicle from the user to the storage space subsequent to the user's access.

In another example of any of the above described automated vehicle delivery systems providing the user access to the vehicle includes providing a limited geographic driving zone to the controller through the smartlock system.

These and other features of the present invention can be best understood from the following specification and drawings, the following of which is a brief description.

DETAILED DESCRIPTION

Figure 1:
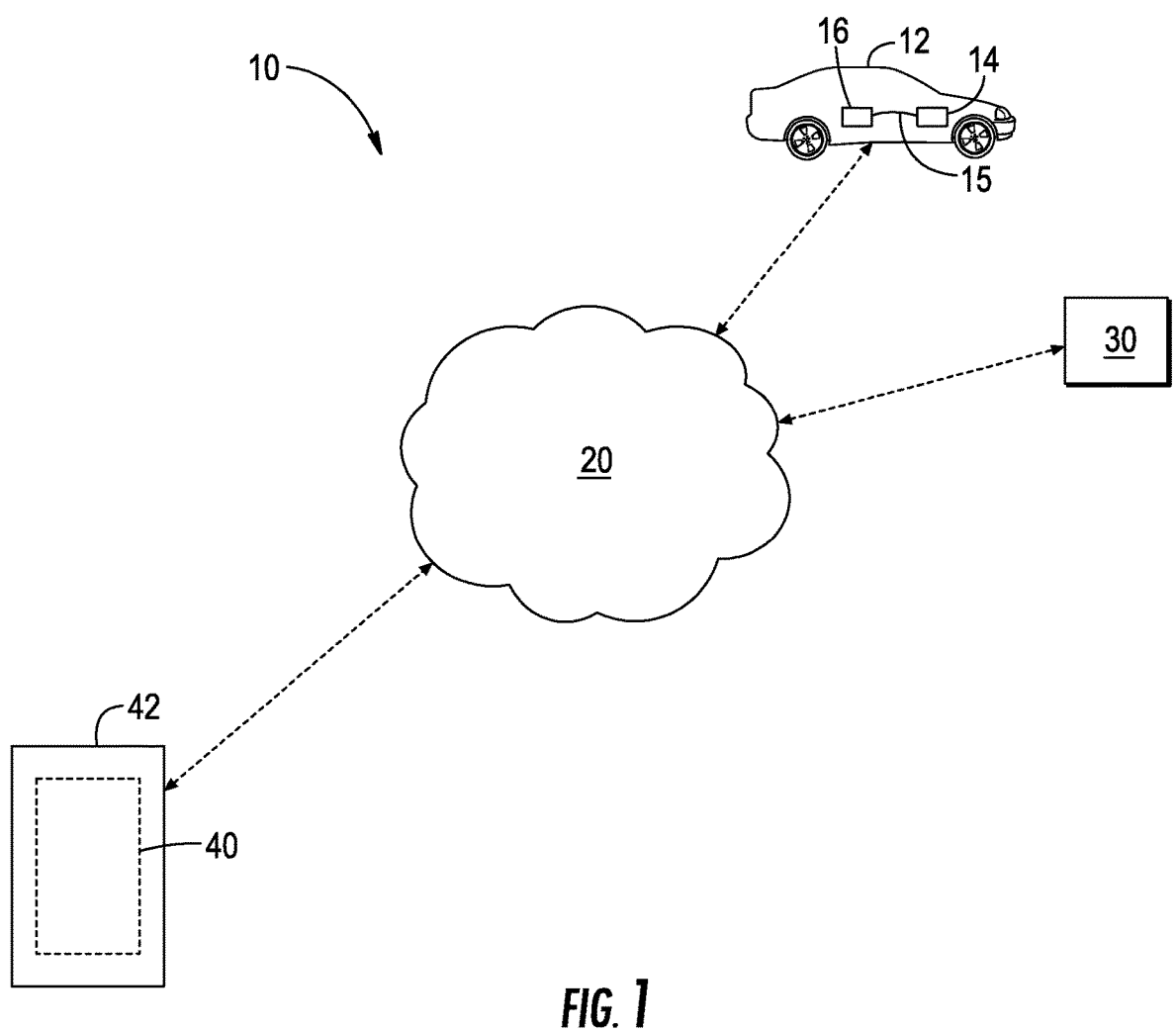
FIG. 1 illustrates a system for providing temporary access to a vehicle.

FIG. 1 illustrates a system 10 for providing access to a vehicle 12. The vehicle 12 is an autonomous or semi-autonomous vehicle. As used herein, an autonomous vehicle is a vehicle including a vehicle controller 14 configured to operate the vehicle 12, including driving, without requiring operator inputs. A semi-autonomous vehicle is a vehicle 12 including the vehicle controller 14, where the vehicle controller 14 is configured to control the vehicle 12 with the assistance of one or more operator. In a semi-autonomous example, the operator may be present or remote from the vehicle 12.

Included on the vehicle 12 is a smartlock system 16. The smartlock system 16 is interfaced with the controller 14 via a communication system 15. One of the controller 14 and the smartlock system 16 includes a data connection that allows the vehicle 12 to communicate with a central server 30 via a data network 20, such as the internet. The central server 30 includes software allowing the central server 30 to receive vehicle access requests, and schedule a specific vehicle 12 to service the temporary access request according to any known software configuration. In some examples the temporary access request can be a test drive request from a prospective purchaser. In alternative examples, the temporary access request can be a scheduled rental duration of the vehicle 12. In yet further examples, the temporary access request can be any authorized temporary access request configured by the central server 30.

Remote from the car, a user engages a software application 40 on a computerized device 42 such as a smartphone or tablet. The computerized device 42 is connected to the data network 20, allowing the software application 40 to communicate with the server 30, or directly with the smartlock system 16 in the vehicle 12.

Figure 2:
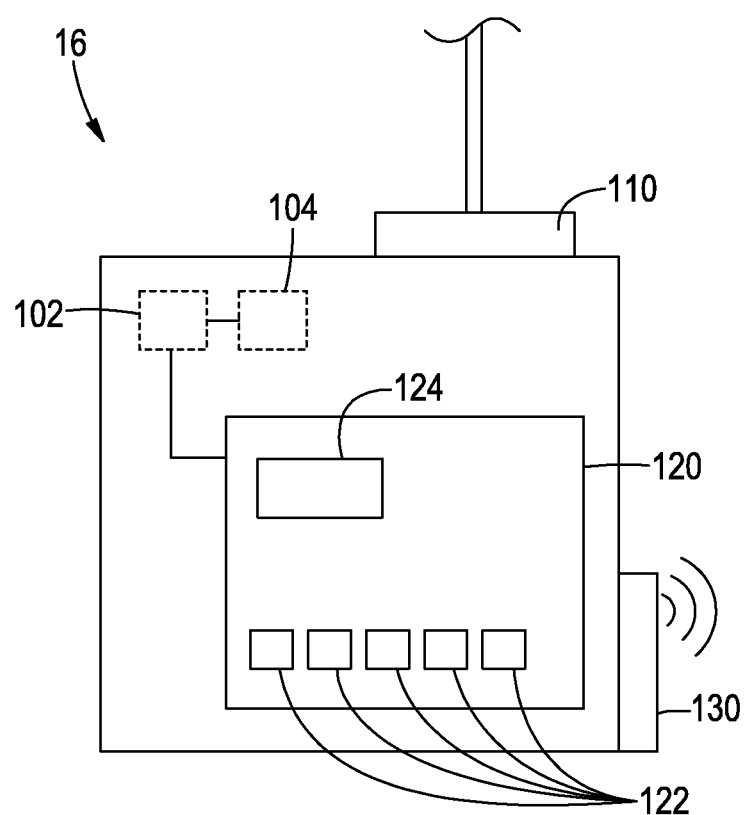
FIG. 2 illustrates an exemplary smartlock system for incorporation in the vehicle of FIG. 1.

With continued reference to FIG. 1, FIG. 2 schematically illustrates the smartlock system 16 of FIG. 1 in greater detail. The smartlock system 16 includes a computer processor 102 and a memory 104. Also included is a communication system 110 interfacing the smartlock system 16 with the vehicle controller 14. In some examples, the smartlock system 16 interfaces with the controller 14, allowing the smartlock system 16 to control the vehicle 12. In alternative examples the smartlock system 16 is controlled by the controller 14, and the controller 14 stores the instructions for operating the smartlock system 16.

In some examples, an input/output (i/o) system 130 is included on the smartlock system 16. The input/output system 130 connects to the central server 30 through the data network 20 and allows the processor 102 to communicate with the central server. In alternative examples, the controller 14 of the vehicle can include an input/output system for communicating with the central server 30 via the data network 20, and the smartlock system 16 can indirectly communicate with the central server 30 through the controller 14.

In some examples, such as those where the vehicle 12 requires a key or a fob to access one or more functions or areas of the vehicle 12, the smartlock system 16 includes a keybox 120. The keybox 120 is an exterior accessible compartment that stores the key, fob, or other access device that allows the user initiating the access request to access the interior of the vehicle 12 and to control the vehicle 12. In some examples, the keybox 120 includes one or more buttons 122 that allow the user to enter a code or provide another access credential before allowing the keybox 120 to open and provide the user access to the key or fob. In alternative examples, the keybox 120 can include a short range wireless communication system 124, such as a Bluetooth communication system. The short range wireless communication system 124 allows the user to authenticate themselves as the vehicle requestor by communicating with the keybox 120, or the smartlock system 16 using the software application 40.

In some examples the smartlock system 16 can include both the short range wireless communication system 124 and the buttons 122, allowing for multi-factor authentication and ensuring that only the person requesting the temporary access to the vehicle is granted that access. In other alternative examples, other known authentication schemes can be used to provide for multi-factor authentication in place of, or in addition to, the authentication schemes described herein.

Figure 3:
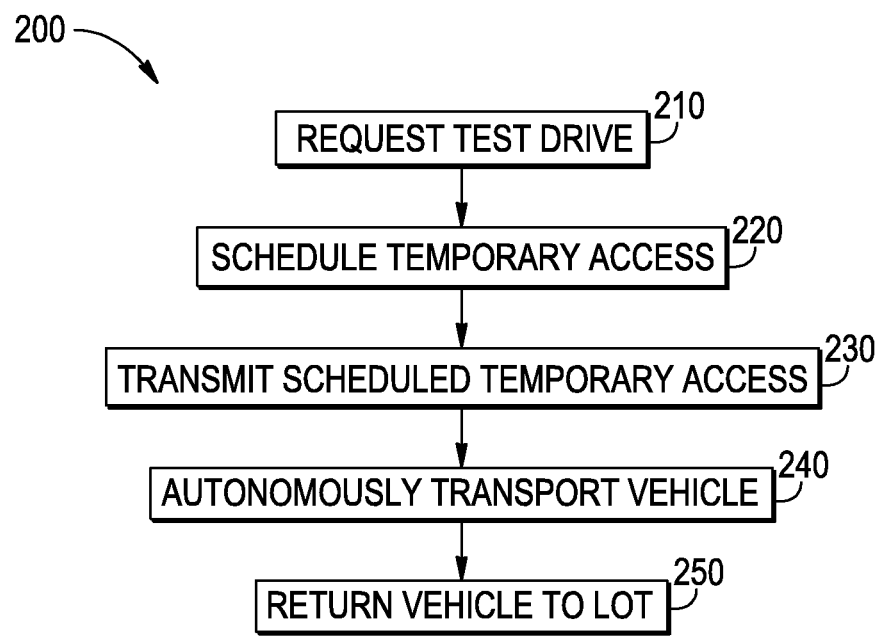
FIG. 3 illustrates a method for providing temporary access to a vehicle using the systems of FIGS. 1 and 2.

With continued reference to both FIGS. 1 and 2, FIG. 3 illustrates a method 200 for granting temporary access within the context of a vehicle test drive. Initially, a user accesses the software application 40 and submits a request for a test drive of a specific type of vehicle, or a specific vehicle in a "Request Test Drive" step 210. The request is transmitted over the data network 20 to the central server 30 and includes essential information such as the GPS location of the user and the time that the user is requesting the test drive be scheduled for.

Once received, the central server 30 parses the request and determines availability of the vehicle 12 in a "Schedule Temporary Access' step 220. As part of the parsing process, the central server 30 authenticates the request as being sent from a valid registered user through the software application 40.

Once authenticated, the central server 30 schedules the temporary access and transmits the temporary access details to the smartlock system 16 in a "Transmit Scheduled Temporary Access" step 230. Included within the scheduled temporary access is the geographic location where the user expects the vehicle 12 to arrive, and the time of arrival. At the scheduled time, the smartlock system 16 interfaces with the vehicle controller 14 causing the vehicle 12 to autonomously, or semi-autonomously, drive to the geographic location in an "Autonomously Transport Vehicle" step 240.

In some examples, the user that requested for the test drive can be alerted on the application 40 that the vehicle is about to depart from the origin location and the user is provided an opportunity to either reschedule or cancel the request.

Once the vehicle 12 arrives at the users location, a multi-factor authentication is provided to the user through the software application 40. The multifactor authentication can include a short range communication between the software application 40 and the smartlock system 16, a manual passcode entry through the buttons 122, or a combination of the two. If the user passes the multi factor authentication, the keybox 120 in the smartlock system opens, and the user is granted access to the key or fob. The key or fob, in turn, allows the user to access the interior portions of the vehicle 12, and allows the user to gain control of the vehicle 12.

Once the temporary access has expired the key or fob is returned to the keybox 120, and the user exits the vehicle. The user then confirms that the vehicle is empty using the software application 40 and the vehicle autonomously navigates back to the car lot in a "Return Vehicle to Lot" step 250.

In some examples, the geographic range or route of the vehicle can be limited during the temporary access. In the example of a test drive, the vehicle 12 can be limited to a specific preplanned route designed to show off the vehicles capabilities and features. In other examples, such as with a vehicle rental, the temporary access can be limited to a geographical range from a center point (referred to as a geofence), with the center point being the delivery location, the car lot location, or any other suitable location determined by the owner of the vehicle.

In some examples, the limited geographic zone is stored within a local memory 104 of the smartlock system 16. In alternative examples, the limited geographic zone can be stored remotely, such as in a cloud network or on the central server 30, and the smartlock system 16 retrieves the limited geographic zone parameters through the input/output device 130.

In some alternate examples, the smartlock system 16 interfaces with the controller 14 of the vehicle 12 via the communication system 110. The interfacing allows the software 40 communicate with the controller 14 and act in place of the key or fob. The communication can, in some examples, be via a local or short range wireless communication. In alternative examples, the communication can be through the network 20 and include an authentication system such as a PIN allowing the user to verify that they are at the vehicle 12.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for providing temporary access to a vehicle comprising:
    receiving a vehicle access request at a vehicle, wherein the vehicle includes a controller configured to operate the vehicle in at least one of a semi-autonomous mode and a fully autonomous mode;
    transporting the vehicle from a storage space to a user originating the vehicle access request using the at least one of the semi-autonomous mode and the fully autonomous mode;
    providing the user access to the vehicle via a smartlock system such that the user is able to operate and control the vehicle; and
    transporting the vehicle from the user to the storage space subsequent to the user's access and providing the user with a confirmation that the user is ending the temporary access and a confirmation that the vehicle is empty.

2. The method of claim 1, wherein receiving the vehicle access request includes receiving a geographic location of the user and a desired arrival time of the vehicle.

3. The method of claim 1, wherein transporting the vehicle from the storage space to the user further comprises providing the user an opportunity to reschedule or cancel the request prior to transporting the vehicle.

4. The method of claim 1, wherein transporting the vehicle from the storage space to the user originating the temporary access request comprises one of autonomously and semi autonomously transporting the vehicle to a receiving area of a lot.

5. The method of claim 1, wherein transporting the vehicle from the storage space to the user originating the temporary access request comprises one of autonomously and semi autonomously transporting the vehicle from a lot to a geographic location provided by the user.

6. The method of claim 1, wherein the smartlock system includes a keybox containing a keyfob configured to allow control of the vehicle, and wherein providing the user access to the vehicle includes providing the user with access to the keybox.

7. The method of claim 6, wherein providing the user access to the keybox is performed subsequent to a multifactor user authentication.

8. The method of claim 7, wherein the multi-factor authentication includes digitally providing the user with an access code via a user application and an entry of the access code into the keybox via the user.

9. The method of claim 1, wherein providing the user access to the vehicle includes providing a limited geographic driving zone to the controller through the smartlock system.

10. The method of claim 9, wherein the limited geographic driving zone is one of a predefined driving route and a geofence.

11. The method of claim 9, wherein the limited geographic zone is stored in a local memory of the smartlock system.

12. The method of claim 9, wherein the limited geographic zone is stored remote from the smartlock system and accessed via a data network.

13. The method of claim 9, wherein the limited geographic driving zone is a zone in which the user is able to drive the vehicle.

14. An automated vehicle delivery system comprising:
    a vehicle, wherein the vehicle is at least semi-automated and includes a vehicle controller configured to at least semi-autonomously control the vehicle;
    a smartlock system connected to the vehicle, wherein the smartlock system includes a memory, a processor, and an input/output (i/o) system configured to connect to a data network;
    wherein the smartlock system is interfaced with the vehicle controller; and
    wherein the smartlock system includes a restricted access compartment configured to be accessed from an exterior of the vehicle and configured to contain an access component for the vehicle, the access component being configured to allow the user to operate and control the vehicle;

the automated vehicle delivery system including a controller configured to cause the automated delivery system to perform the steps of:
receiving a vehicle access request at the vehicle;
transporting the vehicle from a storage space to a user originating the vehicle access request using the at least semi-autonomous control of the vehicle;
providing the user access to the vehicle via the smart-lock system such that the user is able to operate and control the vehicle; and
transporting the vehicle from the user to the storage space subsequent to the user's access and providing the user with a confirmation that the user is ending the temporary access and a confirmation that the vehicle is empty.

15. The automated vehicle delivery system of claim 14, wherein the restricted access compartment is secured via a multi-factor authentication.

16. The automated vehicle delivery system of claim 15, wherein the multi-factor authentication includes a plurality of button inputs and a personal identification number (PIN).

17. The automated vehicle delivery system of claim 15, wherein the multi-factor authentication includes a short range communication system.

18. The automated vehicle delivery system of claim 17, wherein the short range communication system is configured to interface with a computerized device configured to run a specialized software application.

19. The automated vehicle delivery system of claim 14, wherein providing the user access to the vehicle includes providing a limited geographic driving zone to the controller through the smartlock system.

* * * * *